(12) United States Patent
Sanatkar (10) Patent No.: US 9,849,585 B2
(45) Date of Patent: Dec. 26, 2017

(54) ROBOTIC ARM DEVICE WITH THREE DIMENTIONAL MOVEMENT

(71) Applicant: Ali Sanatkar, Tehran (IR)

(72) Inventor: Ali Sanatkar, Tehran (IR)

( * ) Notice: Subject to any disclaimer, the term of this patent is extended or adjusted under 35 U.S.C. 154(b) by 548 days.

(21) Appl. No.: 14/555,601

(22) Filed: Nov. 27, 2014

(65) Prior Publication Data
US 2016/0151910 A1  Jun. 2, 2016

Related U.S. Application Data (60) Provisional application No. 61/981,412, filed on Apr. 18, 2014.

(51) Int. Cl.
*B25J 9/06* (2006.01)
*B25J 9/00* (2006.01)

(52) U.S. Cl.
CPC .............. *B25J 9/06* (2013.01); *B25J 9/0075* (2013.01); *Y10S 901/23* (2013.01); *Y10S 901/25* (2013.01); *Y10S 901/28* (2013.01)

(58) Field of Classification Search
CPC . B25J 9/00; B25J 9/0051; B25J 9/0054; B25J 9/0063; B25J 9/06; B25J 9/065
USPC .............................. 74/490.01, 490.08; 901/18
See application file for complete search history.

(56) References Cited

U.S. PATENT DOCUMENTS

| | | | | | |
|---|---|---|---|---|---|
| 4,300,362 A | * | 11/1981 | Lande | ...................... | B23Q 1/50 414/1 |
| 4,489,826 A | * | 12/1984 | Dubson | ...................... | B25J 9/06 198/812 |
| 5,326,369 A | * | 7/1994 | Schectman | ............. | A61F 2/586 623/24 |
| 9,364,932 B2 | * | 6/2016 | Valasek | .................. | B23Q 1/545 |
| 2009/0248202 A1 | * | 10/2009 | Osuka | .................. | A61B 1/0055 700/245 |
| 2013/0061710 A1 | * | 3/2013 | Long | .................... | B25J 17/0216 74/490.05 |
| 2016/0031080 A1 | * | 2/2016 | Rey | ........................ | B25J 9/0075 74/490.05 |
| 2016/0114479 A1 | * | 4/2016 | Rosheim | ................ | B25J 9/0075 74/490.03 |

(Continued)

FOREIGN PATENT DOCUMENTS

CN       1644312       *   7/2005
CN       101623866     *   1/2010

(Continued)

*Primary Examiner* — William C Joyce
(74) *Attorney, Agent, or Firm* — Barry Choobin; Patent 360

(57) ABSTRACT

A robotic arm for flexible operation in three dimensional space is provided. The robotic arm is divided into several arm parts with multiple joints to move the robot arm in three-dimensional space. The length and angle of the different arm parts are adjustable. The functioning of arm parts is controlled by one or more motors. The motors are configured to control a change in length and angle of the arm parts. Based on usage, a motor is used to change the length and two, four, or six motors or even more motors are used to change the angle and adjust an access to the target. The robot is assembled by varying the number of attachable arm parts depending on the direction of movement and the degree or direction of rotation.

16 Claims, 7 Drawing Sheets

(56) References Cited

U.S. PATENT DOCUMENTS

2016/0151910 A1* 6/2016 Sanatkar ............... B25J 9/0075
                                                                                          74/490.03

FOREIGN PATENT DOCUMENTS

| CN | 103085059 | * | 5/2013 |
| SU | 422580 | * | 4/1974 |

* cited by examiner

FIG. 7

ROBOTIC ARM DEVICE WITH THREE DIMENTIONAL MOVEMENT

CROSS REFERENCE TO RELATED APPLICATIONS

This patent application claims the priority of the U.S. Provisional Patent Application No. 61/981,412 filed on 18 Apr. 2014 having the title "Robotic Arm", and the content of which is incorporated herein by reference in it's entirely.

BACKGROUND

Technical Field

The embodiments herein generally relates to field of robotics. The embodiments herein particularly relates to a robotic arm. The embodiments herein more particularly relates to a flexible robotic arm device with a three dimensional movement.

Description of the Related Art

Automation is defined as a technology that is concerned with the use of mechanical, electronic, and computer-based systems in the operation and control of production. This technology includes transfer lines, mechanized assembly machines, feedback control systems, and robots. There are three broad classes of industrial automation. They are known as fixed automation, programmable automation, and flexible automation. Of these three types, the robotics coincides most closely with programmable automation. An industrial robot is a re-programmable, multifunctional manipulator designed to move materials, parts, tools and special devices through variable programmed motions for performing a variety of tasks. The robot is programmed to move its arm through a sequence of motions in order to perform some useful tasks. The robot repeats a particular movement pattern over and over until the robot is reprogrammed to perform some other task. Hence the programming feature allows the robots to be used for a variety of different industrial operations, many of which involve a working of a robot together with other pieces of an automated or semi-automated equipment.

A robotic arm is a robot manipulator which is used to perform functions similar to a human arm. The parts of the manipulators are connected through joints thereby allowing either rotational or translator motion. There are many different types of robotic arms that are made for different purposes having different degrees of freedom, architectures and applications. Several robotic arms are made till now for different purposes. But they are manufactured for either heavy loading-unloading purposes or very specific purposes. Also many of them are manually controllable.

In the view of the above, there is a need for a mechanical robotic arm device or mechanism made up of a plurality of joint parts so as to enable the robotic arm to move in three dimensional spaces or planes. Further there is need for a flexible robotic arm device with an adjustable arm length and angle.

The above mentioned shortcomings, disadvantages and problems are addressed herein and which will be understood by reading and studying the following specification.

OBJECT OF THE EMBODIMENTS

The primary object of the embodiments herein is to provide a mechanical robotic arm device made up of a plurality of joint parts so as to enable the arm to move in three dimensional spaces or planes and reach the exact coordinates in different axis/directions.

Another object of the embodiments herein is to provide a flexible robotic arm device with an adjustable arm length and angle.

Yet another object of the embodiments herein is to provide a robotic arm assembly with a plurality of sub-parts which are configured by a user depending on direction of movement and degree or direction of rotation.

Yet another object of the embodiments herein is to provide a virtual arm which operates like an actual human hand with joint by joint replication.

Yet another object of the embodiments herein is to provide a robotic arm assembly which reaches any distance from different directions.

These and other objects and advantages of the present embodiments herein will become apparent from the following detailed description taken in conjugation with the accompanying drawings.

SUMMARY

The embodiments herein provide a robotic arm device or assembly. The robotic arm device comprises a plurality of arm parts connected together to collectively form a flexible human arm-like structure. The arm parts are connected to each other by a plurality of joints. The movement of arm parts is controlled by a plurality of motors. The motors are configured to vary a length and angle of the plurality of arm parts. The arm parts comprises a head plate arranged at top of the arm part, a tail plate provided at bottom of the arm part and a plurality of shafts provided to connect the head plate and the tail plate. Thu plurality of shafts comprises power transmission shafts configured to transfer power to the arm part, a length adjustment shaft configured for adjustment the length of the arm part, and two angle adjustment shafts configured for changing the angle of the arm part.

According to one embodiment herein, for every variation in angle of at least one arm part in respect to the proceeding arm part, two power transmission shaft will be added to each of the proceeding arm parts.

According to one embodiment herein, the plurality of shafts of the first arm part is coupled with relative shafts of the second arm part. The central length adjusting shaft of the first arm part is connected to the length adjusting shaft of the second arm part. If the robot has two sections with two separate angles, the power transmission shaft of the last part of the first section is coupled with the angle adjusting shaft of the first arm part of the second section.

According to one embodiment herein, the tail plate is stationary and the head plate is flexible to have an angle. A distance between the tail plate and the head plate is adjusted by moving the head plate with respect to the tail plate.

According to one embodiment herein, the length adjustment shaft is the positioned along the central axis of the robotic arm part and the angle adjustment shaft changes the angle of head plate proportionately with the central axis, when the length of the arm is changed using a length adjustment shaft.

According to one embodiment herein, the plurality of arm parts is moved at a single angle when at least two motors are used for angle adjustment. The plurality of arm parts is moved in plurality of angles that are different from one another, when at least four motors are used.

According to one embodiment herein, the plurality of shafts comprises a spline connection part comprising a plurality of ridges configured for preventing spinning of head and tail plates around the central axis, a jag placed at the end of the plurality of shafts, a screw and nut mechanism configured to provide a mechanism for adjusting a distance and a length of the arm part, an universal power transmission joint configured to transfer power to the screw through the shaft that is placed inside the screw via a key, and a main universal joint configured to prevent nut rotation in order to moves proportionately to the screw rotation and the main universal is arranged concentrically with a universally power joint. The jag is configured to transfer a movement from one arm part to another arm part.

According to one embodiment herein, the screw and nut mechanism comprises a screw fixed to the universal joint and the screw is rotated by the motor. The screw moves a nut whose swirl is limited. The movement of the nut is transferred to the tail plate by the universal joint.

According to one embodiment herein, the universal joint is operated/moved with respect to at least two rotating axes. The plurality of shafts is rotated around the axes for creating a desired length and angle of the arm part. The length adjusting shaft is located at central axis of the arm part and the angle adjusting shafts are located around the central axis, perpendicular to each other according the length adjusting shaft.

According to one embodiment herein, the jag of the pin transfers the motor movement to the universal joint. The universal joint spins the shaft that is fixed inside the screw via a key, the screw rotation cause the nut movement. The nut movement changes the distance between the head plate and the tail plate of the arm part.

According to one embodiment herein, a central shaft of the arm part transfers the power from the motor to the length adjustment shaft for changing the distance between the head plate and the tail plate using the screw and nut mechanism.

According to one embodiment herein, the jag transfer an actuator torque to proceeding arm part by rotating the universal joint of the power transmission shaft.

According to one embodiment herein, the length adjustment shaft is fixed to the head plate via a screw and to the tail plate via the universal joint. The free angle of spinning around the central axis is limited by using the spline connections part.

According to one embodiment herein, the length of the plurality of shafts is changed simultaneously for altering the length of the robotic arm part, without causing a rotation of the arm.

According to one embodiment herein, the angle adjustment shaft is arranged adjacent to the head plate and the tail plate of the arm part via the universal joint. The main universal joint of the angle adjustment shaft is configured to prevent the nut rotation. The main universal joint is arranged concentrically with universal power joint.

According to one embodiment herein, the motor movement is transferred to the jag of the angle adjustment shaft. The motor rotates the screw of the shaft through the jag. The screw spins to move the nut of the shaft thereby changing the length of the shaft. The change in length of the angle adjustment shaft rotates the head plate of the arm part along an axis perpendicular to the central axis.

According to one embodiment herein, the power transmission shaft adjoins the head plate and the tail plate of the arm part using the universal joiners. The pin adopts the jag to transfer the motor movement to the universal joint in-order to enable the movement of the shaft. The shaft in-turn transfers the movement to the proceeding arm part through the universal joint.

These and other objects and advantages of the embodiments herein will become readily apparent from the following detailed description taken in conjunction with the accompanying drawings.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide a robotic arm device or assembly. The robotic arm device comprises a plurality of arm parts connected together to collectively form a flexible human arm-like structure. The arm parts are connected to each other by a plurality of joints. The movement of arm parts is controlled by a plurality of motors. The motors are configured to vary a length and angle of the plurality of arm parts. The arm part comprises a head plate arranged at top of the arm part, a tail plate provided at bottom of the arm part and a plurality of shafts provided to connect the head plate and the tail plate. The plurality of shafts comprises atleast two power transmission shafts configured to transfer power to the arm part, a length adjustment shaft configured for adjusting the length of the arm part, and atleast two angle adjustment shafts configured for changing the angle of the arm part.

According to an embodiment herein, the plurality of shafts of the first arm part is coupled with relative shafts of the second arm part. The central length adjusting shaft of the first arm part is connected to the length adjusting shaft of the second arm part. The power transmission shaft of the first arm part is coupled with the angle adjusting shaft of the second arm part.

According to an embodiment herein, the tail plate is stationary and the head plate is flexible to have an angle. A distance between the tail plate and the head plate is adjusted by moving the head plate with respect to the tail plate.

According to an embodiment herein, the length adjustment shaft is the positioned along the central axis of the robotic arm part and the angle adjustment shaft changes the angle of head plate proportionately with the central axis, when the length of the arm is changed using a length adjustment shaft.

According to one embodiment herein, a motor is used for rotating the length adjustment shafts of all parts. The plurality of arm parts is moved at a single angle when atleast two motors are used for angle adjustment. The plurality of arm parts is moved in plurality of angles that are different from one another, when at least four motors are used.

According to one embodiment herein, the plurality of shafts comprises a spline connection part comprising a plurality of ridges configured for preventing spinning of head and tail plate around the central axis, a jag placed at the end of the plurality of shafts, a screw and nut mechanism configured to provide a mechanism for adjusting a distance and a length of the arm part, an universal power transmission joint configured to transfer power to the screw through the shaft that is fixed inside the screw via key, and a main universal joint configured t prevent nut rotation in order to moves proportionately to the screw rotation and the main universal joint is arranged concentrically with a universal power joint. The jag is configured to transfer a movement from one arm part to another arm part.

According to one embodiment herein, the screw and nut mechanism comprises a screw fixed to the universal joint and the screw is rotated by the motor. The screw moves a nut whose swirl is limited. The movement of the nut is transferred to the tail plate by the universal joint.

According to one embodiment herein, the universal joint is operated/moved with respect to atleast two rotating axes. The plurality of shafts is rotated around the axes for creating a desired length and angle of the arm part. The length adjusting shaft is located at central axis of the arm part and the angle adjusting shafts are located around the central axis, perpendicular to each other according the length adjusting shaft.

According to one embodiment herein, the jag of the shaft transfers the motor movement to the screw. The universal joint spins the shaft that s fixed inside the screw via a key, the screw rotation causes the nut movement. The nut movement changes the distance between the head plate and the tail plate of the arm part.

According to one embodiment herein, a central shaft of the arm part transfers the power from the motor to the length adjustment shaft for changing the distance between the head plate and the tail plate using the screw and nut mechanism.

According to one embodiment herein, the jag transfer an actuator torque to proceeding arm part by rotating the universal joint of the power transmission shaft.

According to one embodiment herein, the length adjustment shaft is fixed to the head plate via a screw and to the tail plate via the universal joint. The free angle of spinning around the central axis is limited by using the spline connection part.

Around to one embodiment herein, the length of the plurality of shafts is changed simultaneously for altering the length of the robotic arm part, without causing a rotation of the arm.

According to one embodiment herein, the angle adjustment shaft is arranged adjacent to the head plate and the tail plate of the plate of the arm via the universal joint. The main universal joint of the angle adjustment shaft is configured to prevent the nut rotation. The main universal joint is arranged concentrically with universal power joint.

According to one embodiment herein, the motor movement is transferred to the jag of the angle adjustment shaft. The motor rotates the screw of the shaft through the jag. The screw spins to move the nut of the shaft thereby changing the length of the shaft. The changes in length of the angle adjustment shaft rotates the head plate of the arm part along an axis perpendicular to the central axis.

According to one embodiment herein, the power transmission shaft adjoins the head plate and the tail plate of the arm part using the universal joints. The pin adopts the jag to transfer the motor movement to the universal joint in-order to enable the movement of the shaft. The shaft in turn transfers the movement to the proceeding arm part through the universal joint.

The embodiments herein provide a robotic arm device which is flexible and operated in three dimensional planes/axes. The robotic arm may be used for various usages and one of the main usages is transferring the objects from one place to another. The robotic arm is mainly adopted for transferring the objects from one place to another. The robotic arm is divided into multiple parts with multiple joints. Due to the multiple numbers of joint parts, the robot arm is enabled to move in three-dimensional planes/axis. The length and angle of the different arm parts are adjacent. Because of its flexibility, the robot is configured to reach any distance from any direction. The user is allowed to assemble the robot by varying the number of attachable arm parts depending on the district of movement and the degree or direction of rotation.

Figure 1:
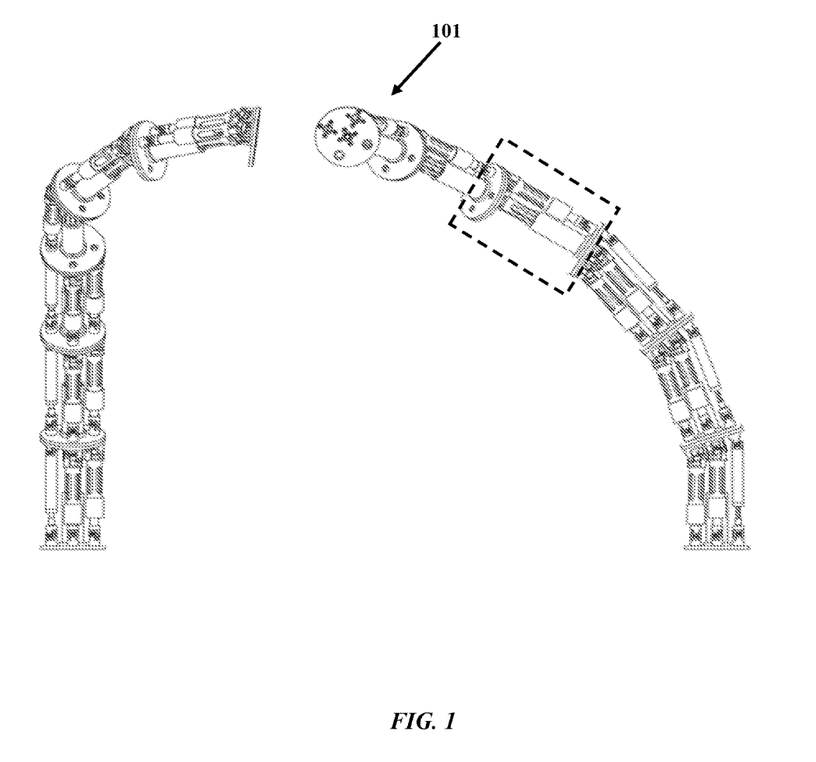
FIG. 1 illustrates a side view of a robotic arm device with a plurality of arm parts connected in series, according to an embodiment herein.
Figure 6:
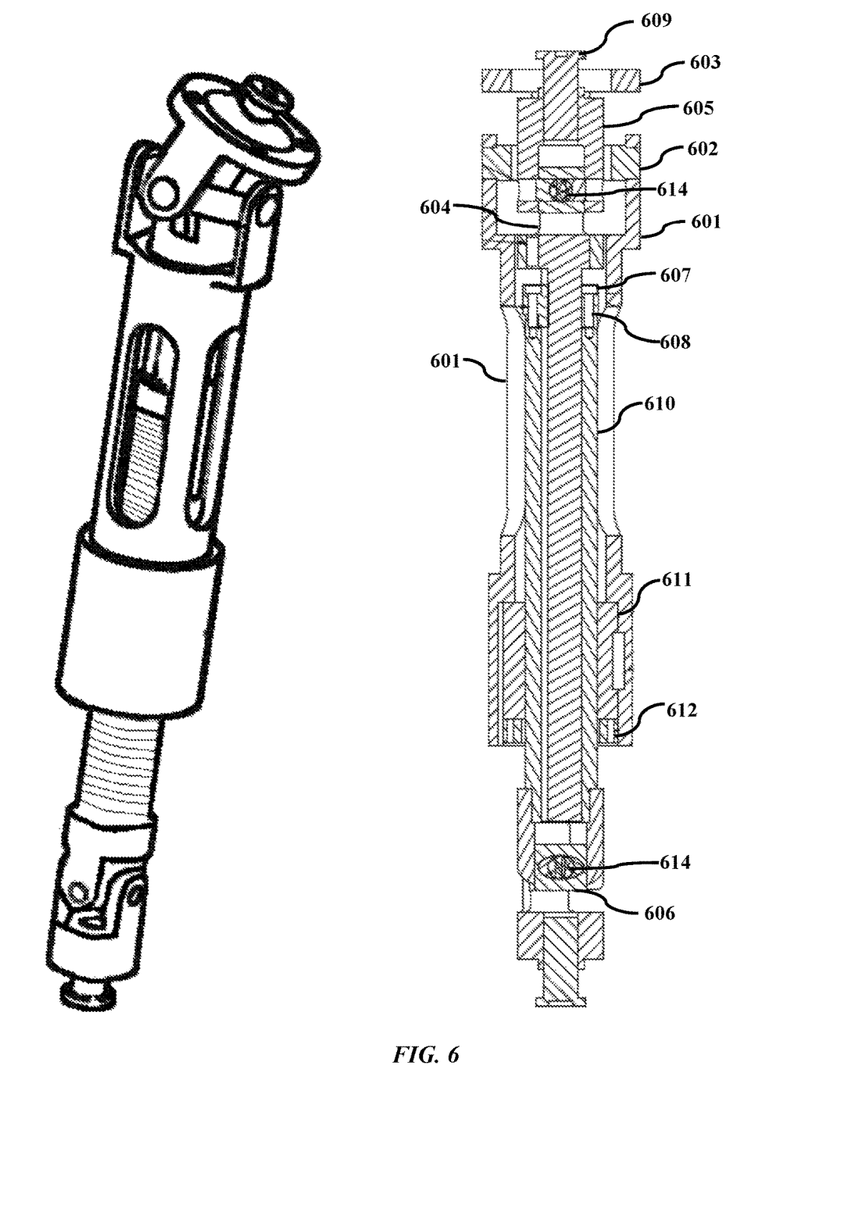
FIG. 6 illustrates a side view and a cross sectional view of a power transmission shaft of the robotic arm, according to an embodiment herein.
Figure 7:
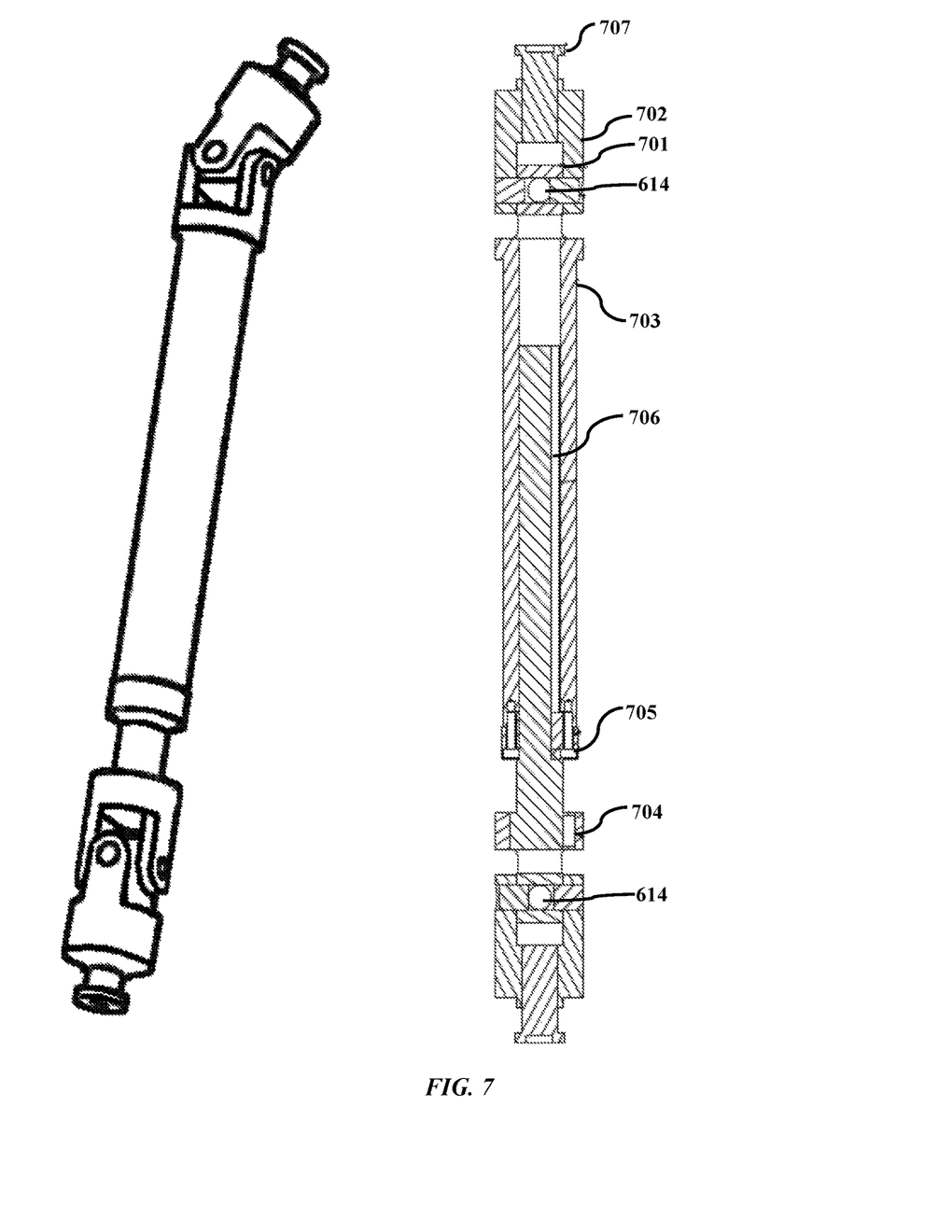
FIG. 7 illustrates a side view and a cross sectional view of an angle adjustment shaft of the robotic arm, according to an embodiment herein.

FIG. 1 illustrates a side view of a robotic arm device with a plurality of arm parts connected in series, according to an embodiment herein. With respect to FIG. 1, the robotic arm 100 comprises a plurality of arm parts 101 connected to collectively form a flexible human arm-like structure. The arm parts 101 are connected to each other by a plurality of joints. The movement of the arm parts 101 are controlled by a plurality of motors 614 (as shown in FIG. 6 and FIG. 7). The motors are configured to control a change in length and angle of the plurality of arm parts 101. According to the usage, a user is enabled to adopt two, four, or six motors or even more motors to change the angle and adjust an access to the target. The motor is configured to operate atleast three arm parts with different angles. The plurality of arm parts 101 is operated with a single angle when two motors are used. Further the arm parts 101 are adjusted/operated in a plurality of angles that are different from one another, when atleast four motors are used. When two motors are used, all the arm parts are aligned with the same angle. When four motors are used, the robot arm 100 is separated in two parts and the second part is adjusted in an angle different from the first part angle. The robotic arm 100, as shown in FIG. 1, comprises first three parts which are aligned at the same angle whereas the next three parts have an angle different from the angle in the first part. By further adding an motor, the robot arm is divided into three parts with all three parts possessing different angles so as to enable the robot arm to reach a target point from different ways.

Figure 2:
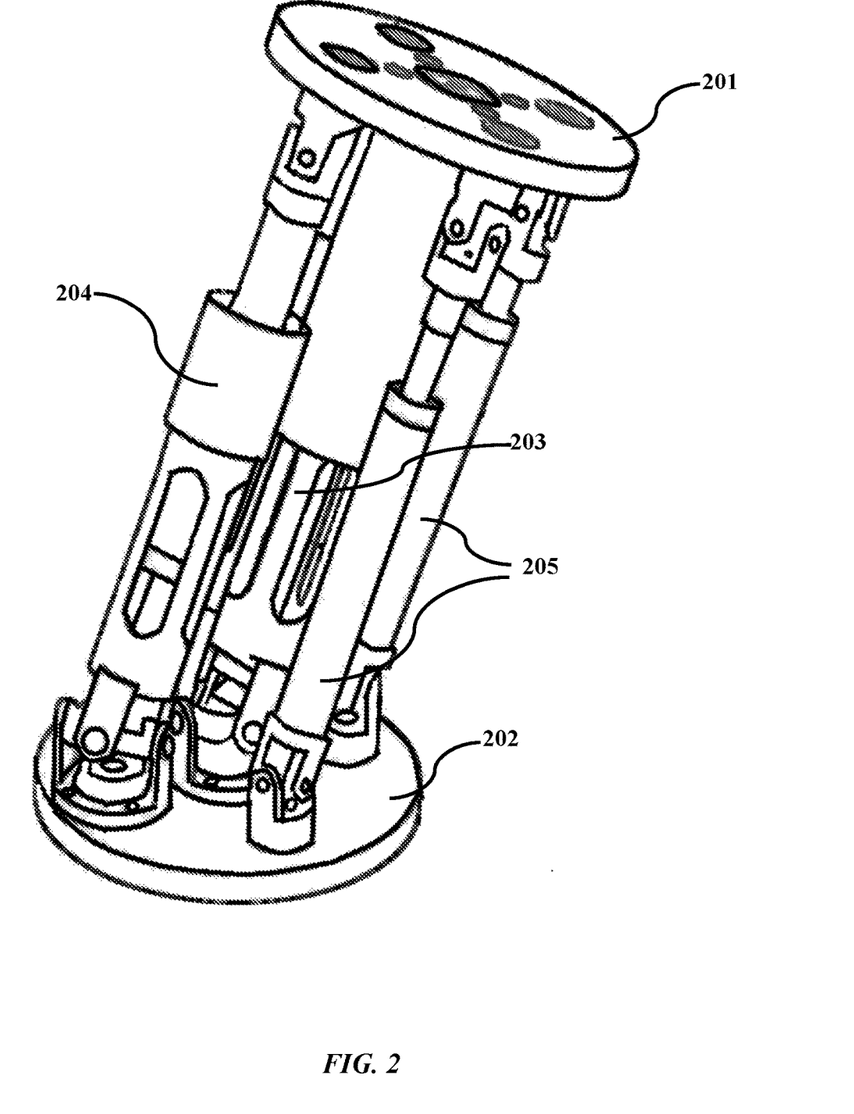
FIG. 2 illustrates a side view of a robotic arm part comprising a plurality of shafts, according to an embodiment herein.

FIG. 2 illustrates a side view of a robotic arm part comprising a plurality of shafts, according to an embodiment herein. With respect to FIG. 2, the arm part 101 comprises a head plate 201 provided at the top of the arm part 101, a tail plate 202 arranged at the bottom of the arm part and a plurality of shafts arranged to connect the head plate 201 and the tail plate 202. The plurality of shafts comprises atleast two power transmission shafts 205, a length adjustment shaft 203 and atleast two angle adjustment shafts 204. The power transmission shafts 205 are configured to transfer power from the corresponding arm part 101 to the proceeding arm part 101. The length adjustment shaft 203 is positioned at the centre of the arm part 101. The shaft 203 is configured to adjust the length of the corresponding arm part 101. The angle adjustment shafts 204 are configured to change the angle of the arm part 101. The length of the arm part 101 is varied according to the power received from the motor connected to the arm part 101.

Figure 3:
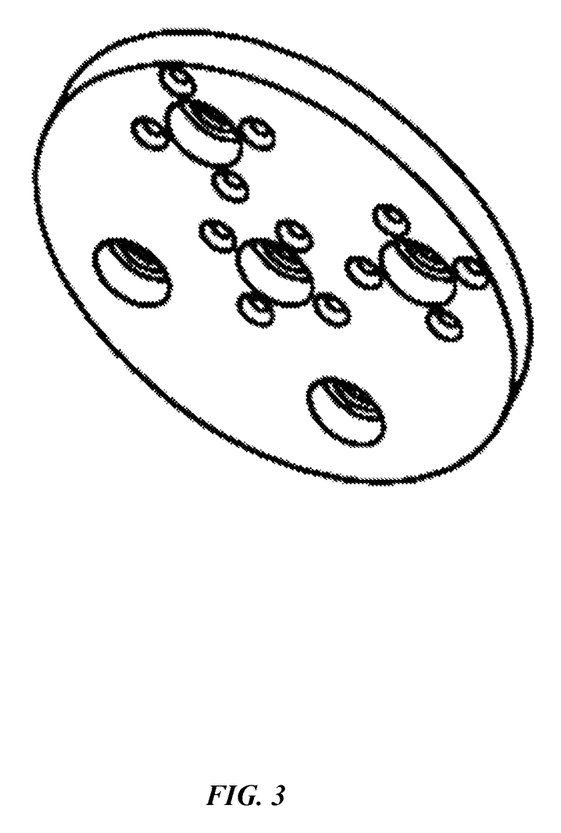
FIG. 3 illustrates a perspective view of a head plate of the robotic arm part, according to an embodiment herein.
Figure 4:
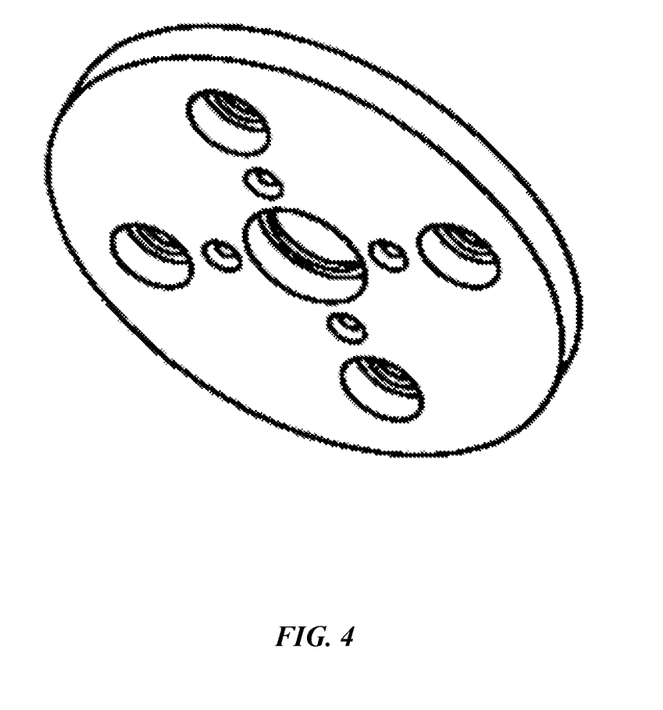
FIG. 4 illustrates a perspective view of a tail plate of the robotic arm part, according to an embodiment herein.

FIG. 3 illustrates a perspective view of a head plate of the robotic arm part, according to an embodiment herein, while FIG. 4 illustrates a perspective view of a tail plate of the robotic arm part, according to an embodiment herein. With respect to FIG. 3 and FIG. 4, the tail plate of the arm part is stationary while the head plate is flexible to have a movement with respect to the tail plate. The tail plate is tilted to have an angle with respect to a horizontal axis. The distance and length of the robotic arm part is adjusted by moving the head plate with respect to the tail plate.

According to an embodiment herein, the plurality of shafts is rotated along atleast two axes for creating a desired length and angle of the arm part. The length adjusting shaft is moved according to a central axis and the angle adjusting shaft is rotated according to a rotating axis perpendicular to the central axis. The length adjustment shaft is positioned along the central axis of the robotic arm part and the angle adjustment shaft changes the angle of head plate proportionately with respect to the central axis when a change in the length of the length adjustment shaft is performed. Consider an arm part of the robot placed along a vertical plane without any angle of inclination. Consider a middle of the plane as an origin. A line along the plane of the length adjustment shaft is considered as Z axis. The line perpendicular to the alignment of the length adjustment shaft and a first angle adjustment shaft is X axis and the line perpendicular the alignment of the length adjustment shaft and a second angle adjustment shaft is Y axis. For example, when the motor controlling the second angle adjustment shaft rotates, the robot arm inclines along the X axis and makes a desired inclination angle in plane YZ. It should be noticed that no change will occur to the angle of the robot and only the length of the robot changes, when the length adjustment shaft and angle adjustment shafts have the same length changes.

Consider, the robotic arm comprises a first arm part and a second arm part connected to each other by the plurality of joints. The plurality of shafts of the first arm part is coupled with the relative shafts of the second arm part. The central length adjusting shaft of the first arm part is connected to the length adjusting shaft of the second arm part so as to enable the second part of the arm to have the length equal to that of the first part. However, when the angle adjustment shafts of the first part and the second part are the same so that the parts cannot make any other angle with respect to each other and thus the action prevents the robot arm from bending in different directions. In order to avoid the aforementioned situation and also to increase an efficiency of the robot, the power transmission shafts of the first arm part are coupled with the angle adjusting shafts of the second arm part. This connection allows the arm part to make the desired inclination angle up to an extent to which the angle adjustment shafts are rotated. The only usage of power transmission shaft is to transfer the motor power to the angle adjusting shafts of the second part. The motor can't adjoin directly to the shafts because of locating of the motors.

The length adjustment shaft and the angle adjustment shafts comprise a screw and nut mechanism for adjusting the distance and length of the corresponding arm part. The screw and nut mechanism comprises a screw which is rotated by a shaft that is fixed inside the screw and moves a nut whose swirl is limited. The screw is configured to revolve according to the motor power. The circular motion of the screw is changed to motion of the nut. The movement of the nut is further transferred to the tail plate by another universal joint. The tail plate organises its angle in proportionate with the central axis after any change in the length of the corresponding shafts. The shafts further comprise a spline connection part having a plurality of ridges. The spline connection part is configured to prevent mechanism interference. The free angle of spinning for head and tail plates around central axis is limited by the number of ridges on the spline connection part.

According to an embodiment herein, the plurality of shafts comprises a jag and a plurality of universal joints placed at the end point of the shafts. The jag is configured to transfer a motor movement from one arm part to other arm part. A universal power transmission joint is configured to transfer power to the head plate and the tail plate of the arm part. A universal main joint present in the length adjustment shaft is configured to fix the nut rotation in proportionate to the screw. The universal main joint is arranged concentrically with the universal power transmission joint. The universal joints are operated with respect to the central axis and the rotating axis. The jag of the pin transfers the motor movement to the shaft that is fixed inside the screw. The screw rotates with the shaft and moves a nut whose swirl is limited by the universal joint. The nut movement changes the distance between the head plate and the tail plate of the arm part. The jag transfer an actuator torque to proceeding arm part by rotating the universal joint of the power transmission shaft.

Figure 5:
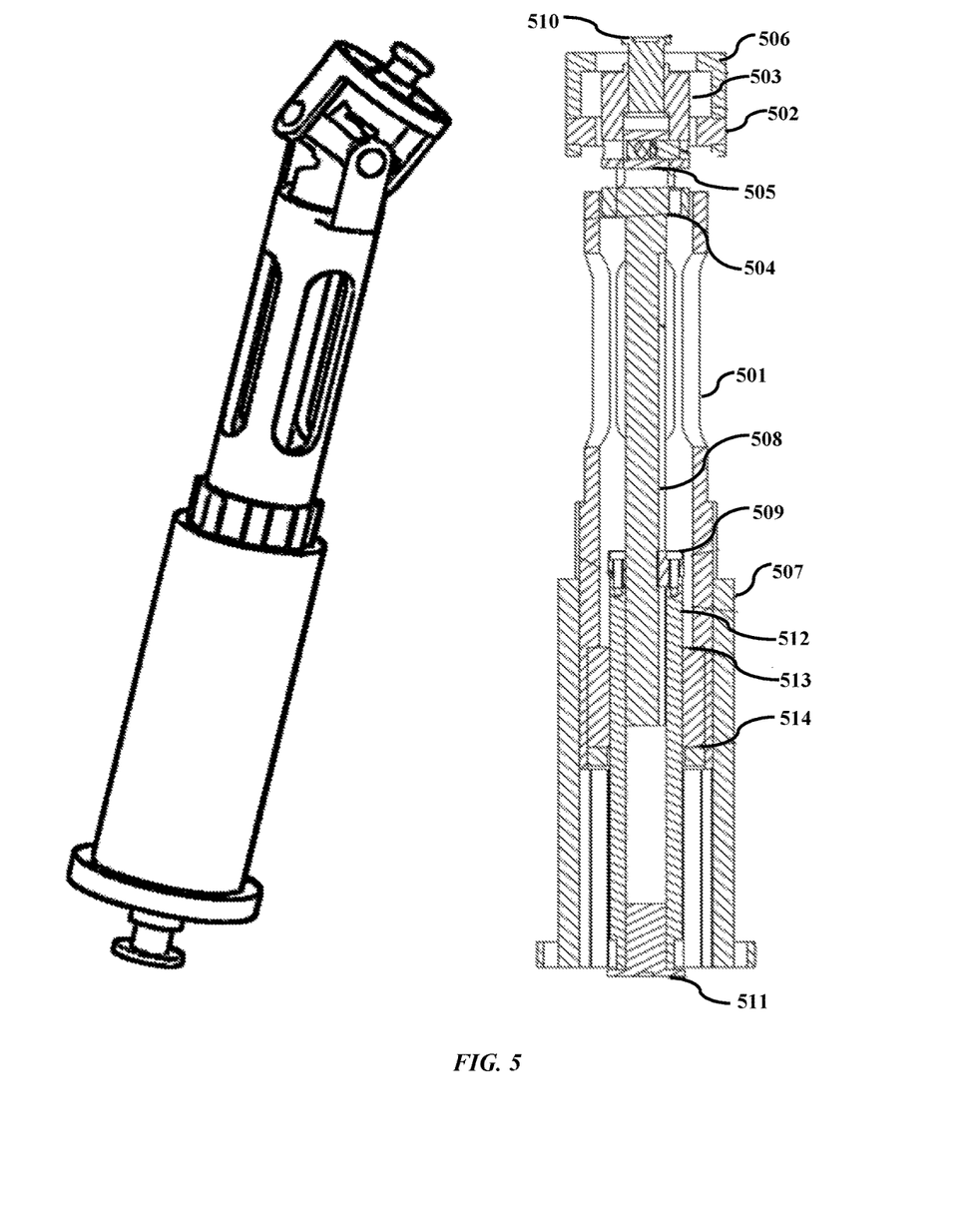
FIG. 5 illustrates a side view and a cross sectional view of a length adjustment shaft of the robotic arm, according to an embodiment herein.

FIG. 5 illustrates a side view and a cross sectional view of a length adjustment shaft of the robotic arm, according to an embodiment herein. With respect to FIG. 5, the length transmission shaft comprises a central power transmission shaft which is configured to transfer the power from the motor to the screw and nut mechanism for changing the distance between the head plate and the tail plate using. The length adjustment shaft is fixed to the head plate via the screw and to the tail plate via the universal joint. The free angle of spinning around the central axis is limited by using a predetermined number of splines between the universal joint 501 and the spline connection part 507 pieces. As the motor movement is transferred to the pin 510 via the jag, the pin 510 is rotated to cause the universal joint 503 to spin as well and the spin is transferred to the shaft 508. The center shaft 508 causes the screw 512 to spin via the jag 509. The spinning of nut 513 is aligned with universal joint 501 via a jag and it prevents the nut from spinning. A nut fixture 514 is fixed at a tag end of the universal joint 501 to prevent the nut from pulling out. As a result, when the screw is spinned, the nut is moved to change the distance between the head plate and the tail plate. Finally, the swirl is transferred to the proceeding arm part via pin 511. The main universal joint including parts 501, 502 and 506 is arranged concentrically with universal power transfer joint including parts 503, 504 and 505.

FIG. 6 illustrates a side view and a cross sectional view of a power transmission shaft of the robotic arm, according to an embodiment herein. With respect to FIG. 6, the angle adjustment shaft is arranged adjoint to the head plate and the tail plate of the arm part via the universal joint. The main universal joint of the angle adjustment shaft is configured to rotate the shaft and screw and limit the rotation of the nut in order to cause nut movement proportionate to the screw rotation. The main universal joint is arranged concentrically with respect universal power joint. The motor movement is transferred to the jag of the angle adjustment shaft. The motor 614 rotates the screw of the shaft through the universal joint and shaft. The screw is rotated to move the nut of the shaft thereby changing the length of the shaft. The change in length of the angle adjustment shaft rotates the head plate of the arm part along an axis perpendicular to the central axis. Similar to the length adjustment mechanism, the motor movement is transferred to screw 609 via a jag to rotate the universal joint 605. So, the rotation is passed through the joint 605 to the joint 604 and passed on to the power transmission shaft 607 so that the screw is rotated via a jag (through a key 608 fixed to the screw 610). The rotation of nut 611 is fixed in the universal joint 601 via a jag and the nut fixture 612 also fixes the nut in the universal joint 601. Nevertheless, when the screw is spun to move the nut and the attached parts so that the length of the mechanism is changed. Due to the fact that the angle adjusting shafts stay in 90 degrees from each other with respect to the central part, changing the length of each shaft enables the head plate to rotate along the rotating axis perpendicular to the central axis. The motor power is transferred to the proceeding part via rotation of universal joint and the screw. The main universal joint including 601, 602 and 603 is used to fix the nut rotation proportionate to the screw and it is concentric with power universal joint 604, 605 and 606.

FIG. 7 illustrates a side view and a cross sectional view of an angle adjustment shaft of the robotic arm, according to an embodiment herein. With respect to FIG. 7, the power transmission shaft is arranged adjacent to the head plate and the tail plate of the arm part using the universal joints. The pin 707 adopts the jag to transfer the motor 614 movement to the universal joint in-order to enable the movement of the shaft 703 and shaft 706. The shaft in-turn transfers the movement to the proceeding arm part through the universal joint. The motor 614 movement is transferred to the universal joint 701, 702, 703, via pin 707. The movement of screw is then transferred to the shaft 706 via jag 705. The shaft in-turn transfers the movement to the opposite universal joint 704 and finally to the proceeding arm part.

The length of the plurality of shafts is changed simultaneously for altering the length of the robotic arm part, without causing rotation of the arm. For altering the length of the robot without rotation, the length of all sub-parts must be altered equally. The length adjustment shaft and the two angle adjustment of each part are changed in the same ratio.

In case the robot has two sections with separate angles, the power transmission shafts of first section that are coupled to the angle adjustment shafts of second section need to be turned to an extent to which the rotation of angle adjustment shaft create required angle of second part. If the length of length adjustment shaft is considered to be fixed, i.e. no rotation happens to it, the length of the arm part remains the same as well. Only by increasing the length of the angle adjustment shaft, the length of the robot is changed. For simplicity of calculations, firstly the length of shafts are changed equally to a desired length, and then by keeping the length adjustment constant and changing the angle adjustment shaft, the angle of the robot is changed.

For simple explanation of robot movement for reaching different points in the space with desired angle, the algorithm for calculating the length and angle of the part of the robot that is assembled with six arm parts and five motors (that divide the robot to two sections with separate angles that each section has three arm parts) will be explained as an example. Suppose the robot consists of three assembled parts. For simple explanation of the relations, the movement of the robot in the space is situated. The movement of the robot in three dimensions is schematized and calculated in two planes.

Firstly, for simplicity, each part of the robot is considered as a straight line, and the total length of each arm part is calculated for achieving the desired coordinate on the plane. The length of each shaft is calculated for achieving the length and angle of each part.

The front end of the robot is considered as the origin. The plane where the bottom end of the robot is located (that is equipped with a welding electrode) is desired to get to the coordinates of (−1300, 1500) with the angle of 36 degrees. It should be noticed that since only one motor manages the movement of the length adjustment shaft of all parts of a robot, they have equal change in length and the length of all parts equal to (L).

Please consider the three initial parts. The coordinates of the final point of the three arm parts are (X1, Y1). The line segment that connects the first point of the first part and the last point of the third part (the first and last points of the first section) is called "H". In case the angle that is made between the first part and its tail palte is called "a", the angle that is made between the first part and line (H) is (90-a). The length of the line segment (H) can be calculated by total length of three length:

$$H = L\cos(a-90) + L + L\cos(a-90) = L(2\sin(a)+1)$$

The angle that is made between the line and X is (2a−90). Hence X1 and Y1 can be calculated through the following relations:

$$X1 = L(2\sin(a)+1)\sin(2a)$$

$$Y1 = -L(2\sin(a)+1)\cos(2a)$$

This relation is also valid for the three parts of the second part, in case the origin is considered at the beginning of the second part and with the rotation of angle 'B'. The angle B equals to: B=3(a−90). The coordinates of the final point of the second part of the robot is calculated as follows in the new coordinate system:

$$X'2 = L(2\sin(a2)+1)\sin(2a2)$$

$$Y'2 = -L(2\sin(a2)+1)\cos(2a2)$$

For expressing the coordinates of the final point of the robot in the original coordinates, that suffice to turn the X'2 and Y'2 coordinates in local coordinates to original ones through transition and rotation of the axis. X2 and Y2 relations can be defined as follows:

$$X2=X1+X'2\ \text{Cos}(B)-Y'2\ \text{Sin}(B)$$

$$Y2=Y1+X'2\ \text{Sin}(B)+Y'2\ \text{Cos}(B)$$

Also it is known that the angle where the final point of robot is located is C. To achieve this the following relation is desired:

$$C=3(a-90)+3(a2-90)$$

In the last three relations, the parameters X2, Y2 and C are known and the parameters a, a2 and L are unknown.

The length of each part and the rotation angle of the first and second parts are attained for achieving the desired coordinates with the definite angle. In the present example, for achieving the coordinates (−1300, 1500) with the angle of 36 degrees, the length of links is 338.3 mm and deviation angle of the first part is 109.25 and the deviation angle of the second part is 82.75 degrees.

In the first part, if the distance between two other subpart and the sub-part of an axis is Z, the relation of length L1 for achieving the desired length and angle is as follows:

$$L1=L-Z\ \tan(90-a)$$

It is worth noting that L2 in the robot is the power transmission part for the next part and defines the necessary length for achieving the desired angle and length regarding the way two planes are located automatically.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A robotic arm assembly comprises:
a plurality of arm parts collectively forming a flexible arm structure, wherein a first arm part is connected to a second arm part by a plurality of joints; and
a plurality of motors configured to control a change in length and angle of the plurality of arm parts;
wherein each of the arm part comprises a head plate arranged at top of the arm part, a tail plate provided at bottom of the arm part and a plurality of shafts connecting the head plate and the tail plate, and wherein the plurality of shafts comprises two power transmission shafts connected to two shafts of a preceding arm part for transferring rotational power to the proceeding arm part, a length adjustment shaft configured for adjusting the length of the arm part, and two angle adjustment shafts configured for changing the angle of the arm part.

2. The robotic arm according to claim 1, wherein the plurality of shafts of the first arm part is coupled with respective shafts of the second arm part, and wherein the length adjusting shaft of the first arm part is connected to the length adjusting shaft of the second arm part, wherein one of the two power transmission shafts of the first arm part is coupled with the angle adjusting shaft of the second arm part.

3. The robotic arm according to claim 1, wherein the tail plate is stationary and the head plate is moveable to have an angle, and wherein a distance between the tail plate and the head plate is adjusted by moving the head plate with respect to the tail plate.

4. The robotic arm according to claim 1, wherein the length adjustment shaft is positioned along the central axis of the robotic arm part and the angle adjustment shaft to change the angle of head plate proportionately with the central axis, when the length of the length adjustment shaft is changed.

5. The robotic arm according to claim 1, wherein a motor is configured to rotate the length adjustment shafts of said arm parts, and wherein the plurality of arm parts is operated through a single angle when at least two motors are used, and wherein the plurality of arm parts are adjusted to be in a plurality of angles that are different from one another, when at least four motors are used.

6. The robotic arm according to claim 1, wherein each shaft comprises:
a spline connection part comprising a plurality of ridges configured for preventing spinning of head and tail plates around the central axis;
a jag placed at the end of the plurality of shafts, wherein the jag is configured to transfer a motor movement from one arm part to another arm part;
a screw and nut mechanism configured to adjust the distance and the length of the arm part;
a universal power transmission joint configured to transfer power to the screw through the shaft that is placed inside the screw via a key; and
a main universal joint configured to fix the nut rotation proportionate to the screw and it is concentric with power universal joint.

7. The robotic arm according to claim 6, wherein the screw and nut mechanism comprises a screw fixed to the universal joint and wherein the screw is rotated by the motor power and wherein the screw moves a nut whose swirl is limited, and wherein the movement of the nut is transferred to the tail plate by the universal joint.

8. The robotic arm according to claim 6, wherein the universal joint is operated with respect to at least two rotating axes, and wherein the plurality of shafts are rotated around the central axes for creating a desired length and angle of the arm part, wherein the length adjusting shaft is changed according to the central axis and the angle adjusting shafts are located around the central axis, parallel to each other according the length adjusting shaft.

9. The robotic arm according to claim 6, wherein the jag of the pin transfers the motor movement to the shaft that is fixed inside the screw, and wherein the screw rotates with the shaft and moves a nut whose swirl is limited by the universal joint, and wherein the nut movement changes the distance between the head plate and the tail plate of the arm part.

10. The robotic arm according to claim 6, wherein the jag transfer an actuator torque to proceeding arm part by rotating the universal joint of the power transmission shaft.

11. The robotic arm according to claim 1, wherein a shaft of the arm part transfers the power from the motor to the length adjustment shaft for changing a distance between the head plate and the tail plate using a screw and nut mechanism.

12. The robotic arm according to claim 1, wherein the length adjustment shaft is fixed to the head plate via a screw and to the tail plate via the universal joint, and wherein a free angle of spinning around the central axis is limited by using a spline connection part.

13. The robotic arm according to claim 1, wherein the length of the plurality of shafts is changed simultaneously for altering a length of the robotic arm part, without causing a rotation of the arm.

14. The robotic arm according to claim 1, wherein the angle adjustment shaft is arranged adjoint to the head plate and the tail plate of the arm part via the universal joint, and wherein a main universal joint of the angle adjustment shaft is configured to prevent a nut rotation, and wherein the main universal joint is arranged in concentric to the universal power joint.

15. The robotic arm according to claim 1, wherein a motor movement is transferred to a jag of the angle adjustment shaft, and wherein a motor rotates a pin through the jag, and wherein the pin rotates a universal joint and shaft that is inside a screw and wherein the screw is rotated to move a nut of the shaft thereby changing a length of the shaft, and wherein the length of the angle adjustment shaft is changed to rotate the head plate of the arm part along an axis perpendicular to a central axis.

16. The robotic arm according to claim 1, wherein the power transmission shaft is arranged adjacent to the head plate and the tail plate of the arm part using a universal joints, and wherein a pin adopts a jag to transfer a motor movement to a universal joint in order to transfer the motor movement to a screw and nut mechanism, and wherein the shaft in-turn transfers the movement to a proceeding arm part through the universal joint.

* * * * *